(12) United States Patent
Tung

(10) Patent No.: US 12,054,214 B2
(45) Date of Patent: Aug. 6, 2024

(54) DROPPER SEATPOST WITH DOUBLE GAS CHAMBER

(71) Applicant: TURNON COMPONENTS CO., LTD., Tainan (TW)

(72) Inventor: Ching Tung, Tainan (TW)

(73) Assignee: Turnon Components Co., Ltd., Tainan (TW)

( * ) Notice: Subject to any disclaimer, the term of this patent is extended or adjusted under 35 U.S.C. 154(b) by 530 days.

(21) Appl. No.: 17/407,310

(22) Filed: Aug. 20, 2021

(65) Prior Publication Data

US 2022/0153371 A1 May 19, 2022

(30) Foreign Application Priority Data

Nov. 13, 2020 (TW) ................................. 109215019

(51) Int. Cl.
*B62J 1/06* (2006.01)
(52) U.S. Cl.
CPC ...................................... *B62J 1/06* (2013.01)
(58) Field of Classification Search
CPC .......................................................... B62J 1/06
USPC .......................................................... 280/283
See application file for complete search history.

(56) References Cited

U.S. PATENT DOCUMENTS

| 3,861,740 A | * | 1/1975 | Tajima | ................... | B62K 19/36 |
| | | | | | 248/404 |
| 2018/0057087 A1 | * | 3/2018 | Jhou | ...................... | F15B 15/202 |

* cited by examiner

*Primary Examiner* — Tony H Winner
*Assistant Examiner* — Felicia L. Brittman
(74) *Attorney, Agent, or Firm* — Rosenberg, Klein & Lee

(57) ABSTRACT

A dropper seatpost with double gas chambers is revealed. The dropper seatpost mainly includes a hydraulic inner tube and an outer tube in which the hydraulic inner tube is moveably mounted. A second gas chamber is formed between the hydraulic inner tube and the outer tube. While increasing a height of a saddle mounted above the hydraulic inner tube, pressure of high-pressure gas in the second gas chamber not only improves speed and fluency of the hydraulic inner tube being lifted, but also optimizes concentricity and side force resistance of both the hydraulic inner tube and the outer tube. The high-pressure gas in the second gas chamber also reduces abnormal sound produced by bubbles. Each of two ends of the outer tube is provided with a seal member for protecting the outer tube from pollutants outside. Thereby both durability and service life are improved.

4 Claims, 8 Drawing Sheets

DROPPER SEATPOST WITH DOUBLE GAS CHAMBER

BACKGROUND OF THE INVENTION

Field of the Invention

The present invention relates to a bicycle seatpost, especially to a dropper seatpost with double gas chambers, which not only improves speed and fluency of a hydraulic inner tube are improved, but also optimizes concentricity and side force resistance of both the hydraulic inner tube and an outer tube. Abnormal sound produced by the raised hydraulic inner tube is also reduced and both durability and service life of the dropper seatpost are increased.

DESCRIPTION OF RELATED ART

Refer to U.S. Pat. No. 3,861,740, a saddle position adjusting device for a vehicle such as a bicycle is revealed. A saddle position adjusting device for a vehicle includes an oil cylinder carrying a saddle at one end and having oil and gas under high-pressure contained therein. The oil cylinder is mounted in frame means of the vehicle by means whereby the cylinder is slidable in the axial direction but not rotatable with respect to the frame means. The means includes a piston arranged in the cylinder for communicating the oil between the spaces above and below the piston, means for locking the oil cylinder at a desired position, and means for releasing the lock of the oil cylinder. The locking means includes a piston rod of which the lower end is fixed to the frame means while the releasing means is constructed and arranged to permit operation by a rider while on said vehicle.

The above US patent uses compressible property of the gas in combination with flowing of oil to make the oil cylinder move upward or downward with respect to the frame means for adjusting height of a saddle. However, the piston has s series of narrow oil paths. The oil cylinder is moved upward or downward at a lower speed and not smoothly because of a large resistance of the oil passing through the narrow oil paths. Moreover, after the free piston being pressured, the movement causes a certain change of gas leakage. After the gas passing the free piston, bubbles are difficult to return to the original position. This leads to abnormality of the oil cylinder. Beside abnormal sounds produced by small bubbles, a compression curve of the oil cylinder is also affected. More serious gas leakage will result in malfunction or loss of function, etc. In another embodiment, the oil cylinder includes no free piston. After the oil mixed with gas, it's easier to have abnormal sounds created by small oil bubbles. The frame means is fixed to the cylindrical body with a bolt arranged outside the frame pipe at its upper end. Such mechanical fixation has problems of complicated fastening structure, clearance, etc., which cause poor yield rate and low market acceptance. Furthermore, there is no O-ring arranged between the cylindrical body and the frame pipe so that pollutants outside such as moisture, sand and dust, salt, etc. are easily infiltrated into the frame pipe through a gap between the cylindrical body and the frame pipe and further resulting in oxidation, fouling, interference, abrasion, etc. inside the frame pipe. Thereby both durability and service life of the saddle position adjusting device are reduced.

SUMMARY OF THE INVENTION

Therefore, it is a primary object of the present invention to provide a dropper seatpost with double gas chambers, which not only improves speed and fluency of a hydraulic inner tube, but also optimizes concentricity and side force resistance of the hydraulic inner tube and an outer tube. Abnormal sound produced by the raised hydraulic inner tube is also reduced and both durability and service life of the dropper seatpost with double gas chambers are increased.

In order to achieve the above objects, a dropper seatpost with double gas chambers according to the present invention includes a hydraulic inner tube and an outer tube in which the hydraulic inner tube is moveably mounted. A second gas chamber is formed between the hydraulic inner tube and the outer tube. While lifting a saddle mounted above the hydraulic inner tube, pressure of high-pressure gas in the second gas chamber not only improves the speed and fluency of the hydraulic inner tube being raised, but also optimizes concentricity and side force resistance of the hydraulic inner tube and the outer tube. The high-pressure gas in the second gas chamber can also reduce abnormal sound produced by bubbles while the hydraulic inner tube is moved.

Moreover, each of two ends of the outer tube is provided with a seal member for protecting the outer tube from pollutants outside. Thereby both durability and service life of the present device are increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
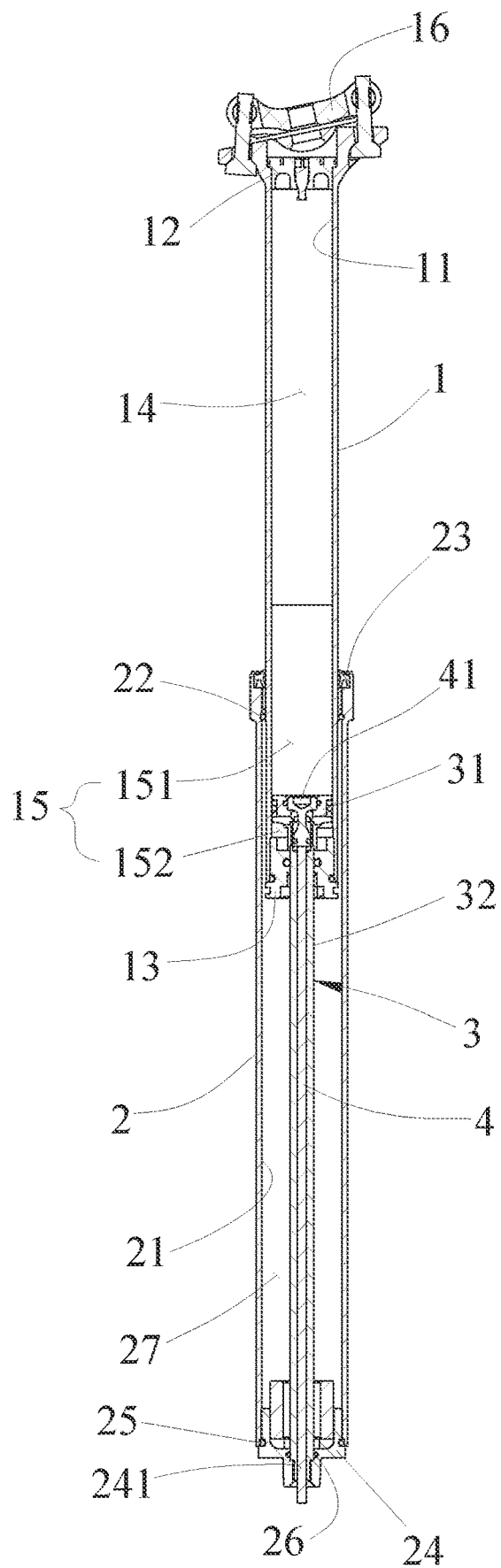
FIG. 1 is a sectional view of an embodiment according to the present invention.
Figure 2:
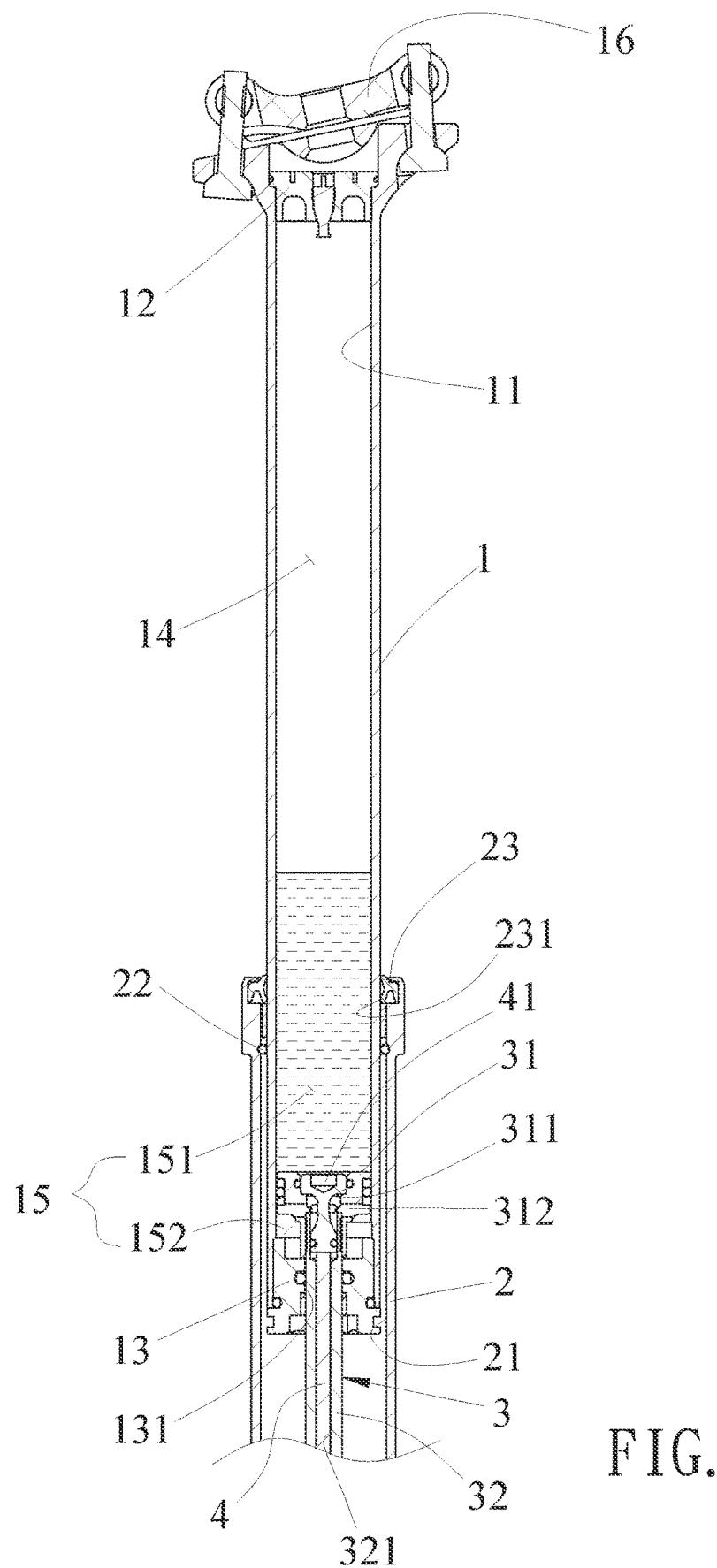
FIG. 2 is a partial sectional view of an embodiment according to the present invention.

Refer to FIG. 1 and FIG. 2, a dropper seatpost with double gas chambers according to the present invention mainly includes a hydraulic inner tube 1, an outer tube 2, a piston set 3, and a valve stem 4.

The hydraulic inner tube 1 having a first and a second end opposite to each other is composed of an inner tube hole 11 formed in the length direction thereof and penetrating the first end and the second end thereof, a first inner-tube plug 12 mounted in the inner tube hole 11 at the first end, a second inner-tube plug 13 arranged in the inner tube hole 11 at the second end and provided with a through hole 131 at a center of the second inner-tube plug 13, a first gas chamber 14, an oil storage space 15, and a saddle assembly member 16 arranged at the first end thereof. The inner tube hole 11 is filled with hydraulic oil and gas which is air in this embodiment. The first gas chamber 14 is formed between a surface of the hydraulic oil and the first inner-tube plug 12 while the oil storage space 15 is located between the surface of the hydraulic oil and the second inner-tube plug 13.

The outer tube 2 which has a first and a second end opposite to each other consists of an outer tube hole 21 formed in the length direction thereof and penetrating the first end and the second end, at least one first seal member 22 and a first outer-tube plug 23 mounted in the outer tube hole 21 at the first end in turn, a second outer-tube plug 24 arranged in the outer tube hole 21 at the second end and provided with a second through hole 241 at a center of the second outer-tube plug 24, at least one second seal member 25 mounted to an outer wall of the second outer-tube plug 24 and in close contact with a wall surface of the outer tube hole 21 of the outer tube 2, at least one third seal member 26 mounted to a wall surface of the second through hole 241, and a second gas chamber 27. The first outer-tube plug 23 is provided with a first through hole 231 at a center thereof. The second end of the hydraulic inner tube 1 is inserted into the first through hole 231 of the first outer-tube plug 23 so that the second end of the hydraulic inner tube 1 is mounted in the outer tube hole 21 of the outer tube 2. The first seal member 22 is in close contact with the wall surface of the outer tube hole 21 of the outer tube 2 and an outer wall of the hydraulic inner tube 1. The outer tube hole 21 of the outer tube 2 is filled with gas which is air so as to form the second gas chamber 27 between the hydraulic inner tube 1 and the outer tube 2.

As shown in FIG. 1, the piston set 3 is formed by a piston 31 and a piston rod 32 each of which is provided with a first end and a second end opposite to each other. The piston 31 is located in the inner tube hole 11 of the hydraulic inner tube 1 for separating the oil storage space 15 of the hydraulic inner tube 1 into a first oil chamber 151 located between the surface of the hydraulic oil and the first end of the piston 31, and a second oil chamber 152 located between the second end of the piston 31 and the second inner-tube plug 13. Refer to FIG. 2, a valve hole 311 is disposed on a center of the piston 31 and penetrating the first end and the second end of the piston 31 while a plurality of diversion holes 312 are arranged around the piston 31 and communicating with the valve hole 311. The piston rod 32 is inserted and mounted in the through hole 131 of the second inner-tube plug 13 of the hydraulic inner tube 1 so that the first end of the piston rod 32 is located in the inner tube hole 11 of the hydraulic inner tube 1 while the second end of the piston rod 32 is located in the outer tube hole 21 of the outer tube 2. The first end of the piston rod 32 is mounted in the valve hole 311 at the second end of the piston 31 and the second end of the piston rod 32 is connected to the second through hole 241 of the second outer-tube plug 24 for positioning while an outer wall of the piston rod 32 is in close contact with the third seal member 26 mounted on the wall surface of the second through hole 241. A penetrating hole 321 is formed in the piston rod 32 lengthwise and penetrating the first end and the second end of the piston rod 32.

The valve stem 4 is inserted and mounted in the penetrating hole 321 of the piston rod 32 and also having a first end and a second end thereof opposite to each other. A valve block 41 is disposed on the first end of the valve stem 4 and abutting against the valve hole 311 at the first end of the piston 31 correspondingly while the second end of the valve stem 4 is inserted through the second through hole 241 of the second outer-tube plug 24 and exposed outside.

While being assembled, the outer tube 2 of the present invention is mounted to a seat tube of a frame of a bicycle and a bicycle saddle is disposed on the saddle assembly member 16 at the first end of the hydraulic inner tube 1. A control member is arranged at a bicycle grip and connected to the second end of the valve stem 4 in a wired or wireless way. Thus the assembly of the present device with the bicycle is completed.

Figure 3:
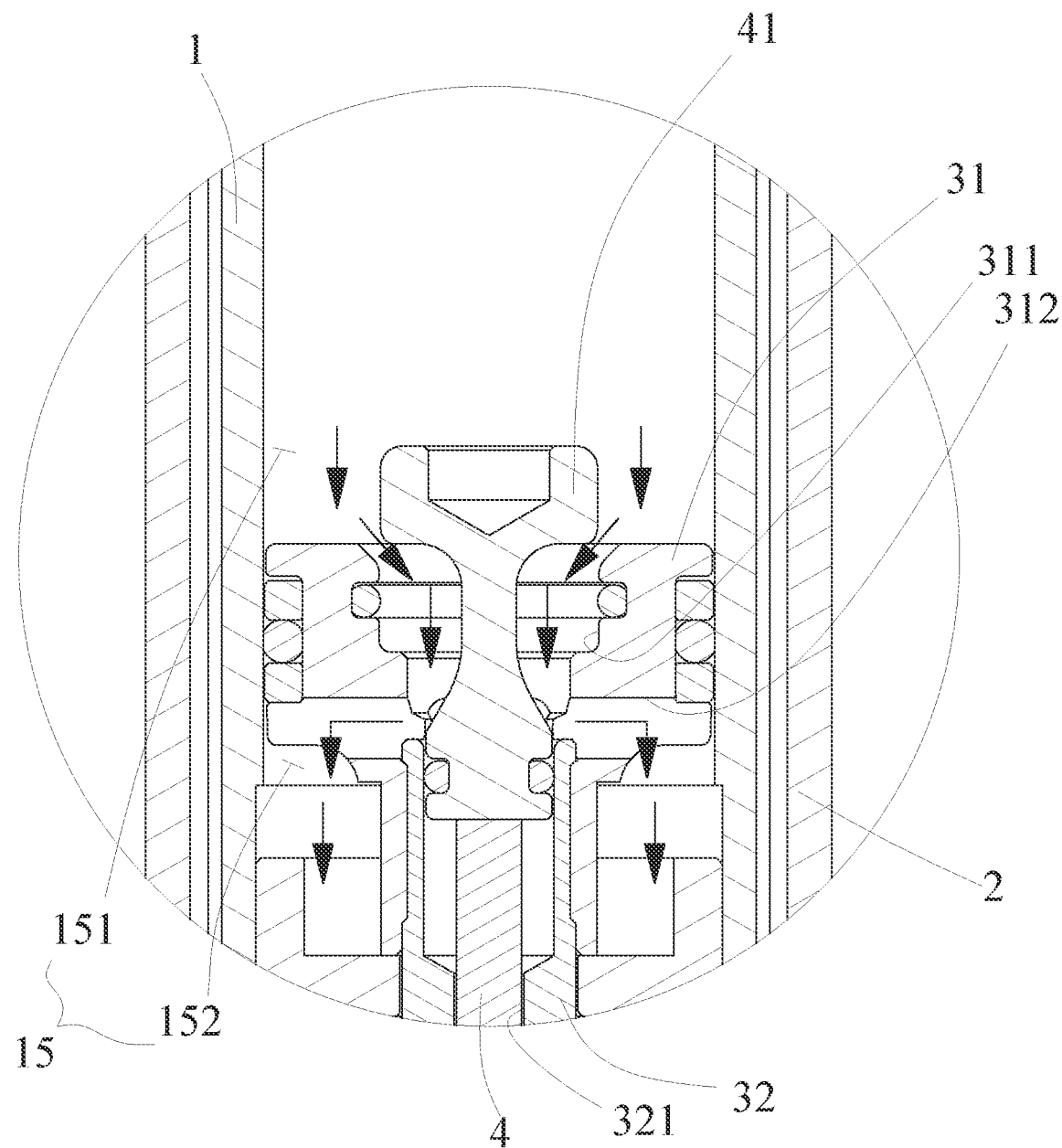
FIG. 3 is a partial enlarged sectional view showing flowing of hydraulic oil in a hydraulic inner tube going downward of an embodiment according to the present invention.
Figure 4:
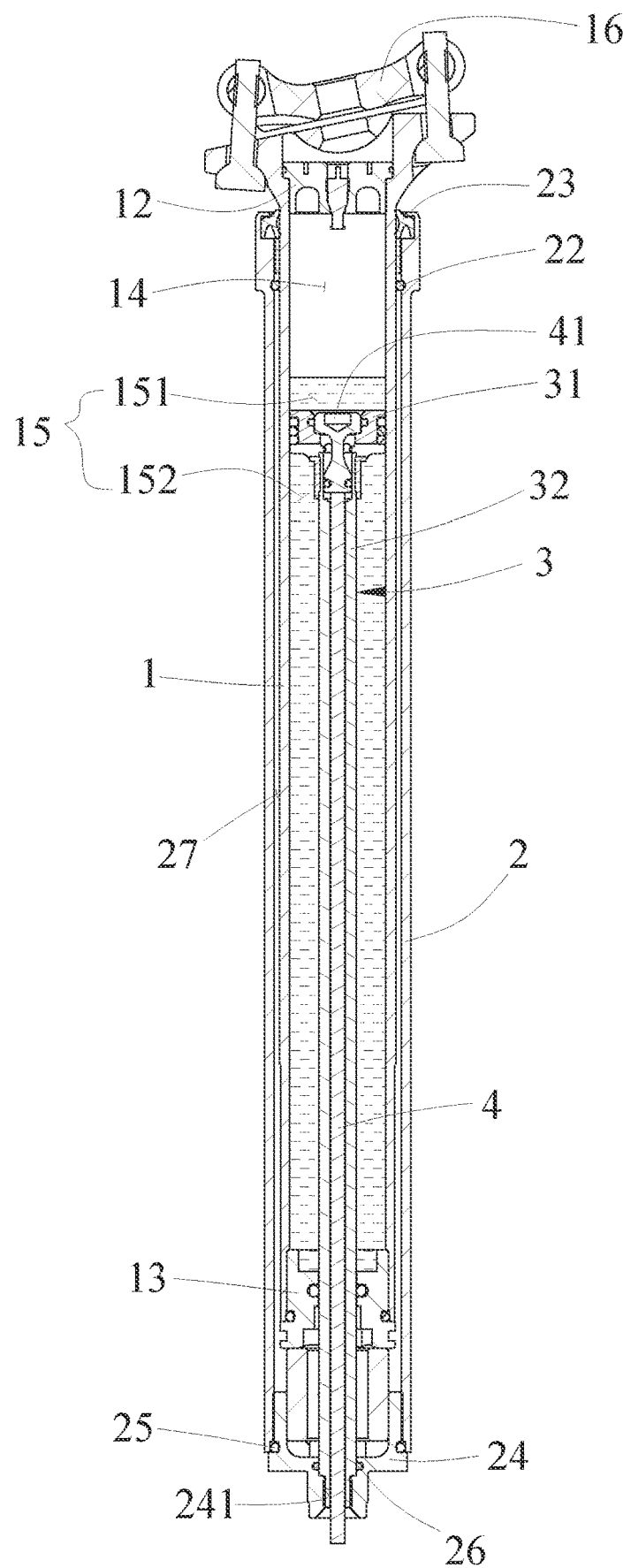
FIG. 4 is a sectional view showing a hydraulic inner tube going downward to a positioned state of an embodiment according to the present invention.

Also refer to FIG. 3, when users intend to adjust a height of the saddle, a valve opening signal from the control member on the bicycle grip drives the valve stem 4 to move upward so that the valve block 41 on the first end of the valve stem 4 is released from the valve hole 311 of the piston 31 to allow the first oil chamber 151 and the second oil chamber 152 of the hydraulic inner tube 1 communicating with each other. Thereby the hydraulic inner tube 1 connected to the saddle is moved downward when users press the saddle downward. Now hydraulic oil in the first oil chamber 151 of the hydraulic inner tube 1 is squeezed, passed through the valve hole 311 of the piston 31, flowing into the diversion holes 312 located around the piston 31 and communicating with the valve hole 311, and finally reached the second oil chamber 152. The flowing of hydraulic oil makes the hydraulic inner tube 1 move into the outer tube hole 21 of the outer tube 2 to achieve the reduced height of the saddle while the gas in the second gas chamber 27 between the hydraulic inner tube 1 and the outer tube 2 is compressed at the same time. Also refer to FIG. 4, when users adjust the saddle to the height required, a valve-close signal is sent from the control member of the bicycle grip for driving the valve stem 4 to move back to the original position. Thus the valve hole 311 at the first end of the piston 31 is closed by the valve block 41 at the first end of the valve stem 4 and hydraulic oil in the first oil chamber 151 and the second oil chamber 152 is not communicating for fixing the height of the saddle. While the user sits on the saddle, gas in the first gas chamber 14 of the hydraulic inner tube 1 supports the user's body weight.

Figure 5:
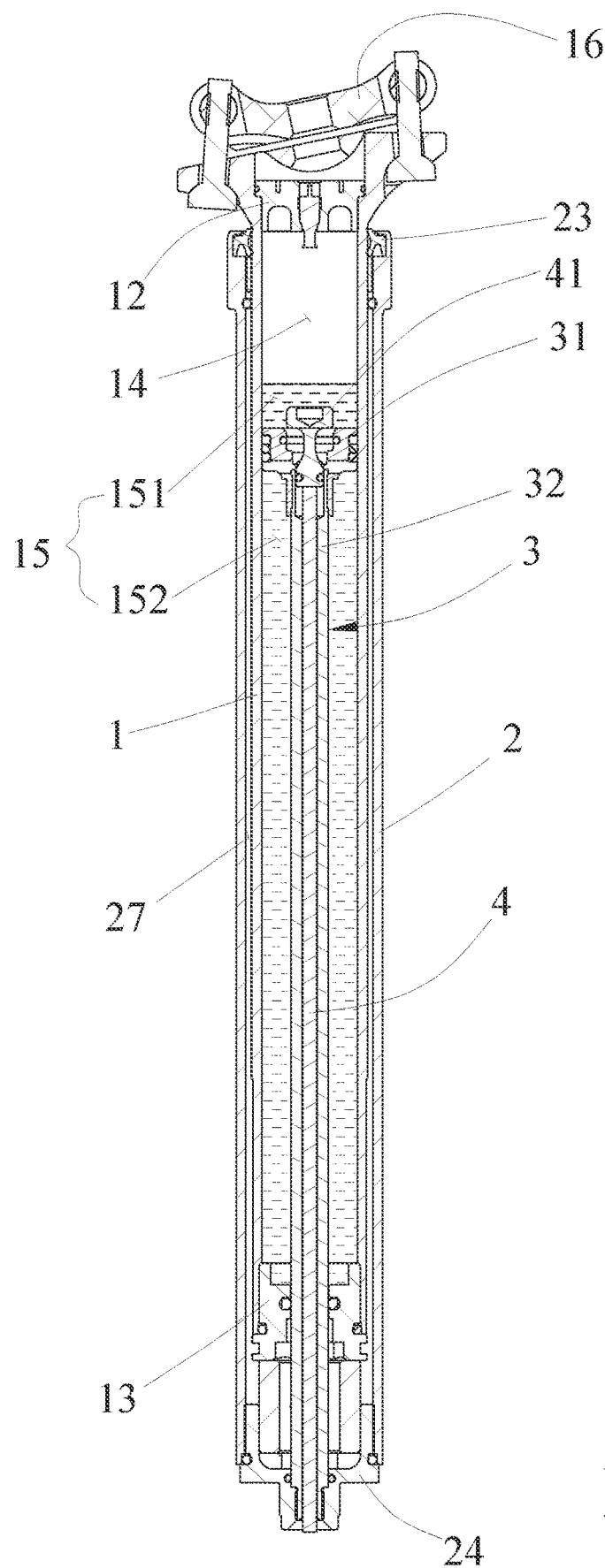
FIG. 5 is a sectional view showing a hydraulic inner tube moved upward with valve-open state of an embodiment according to the present invention.
Figure 6:
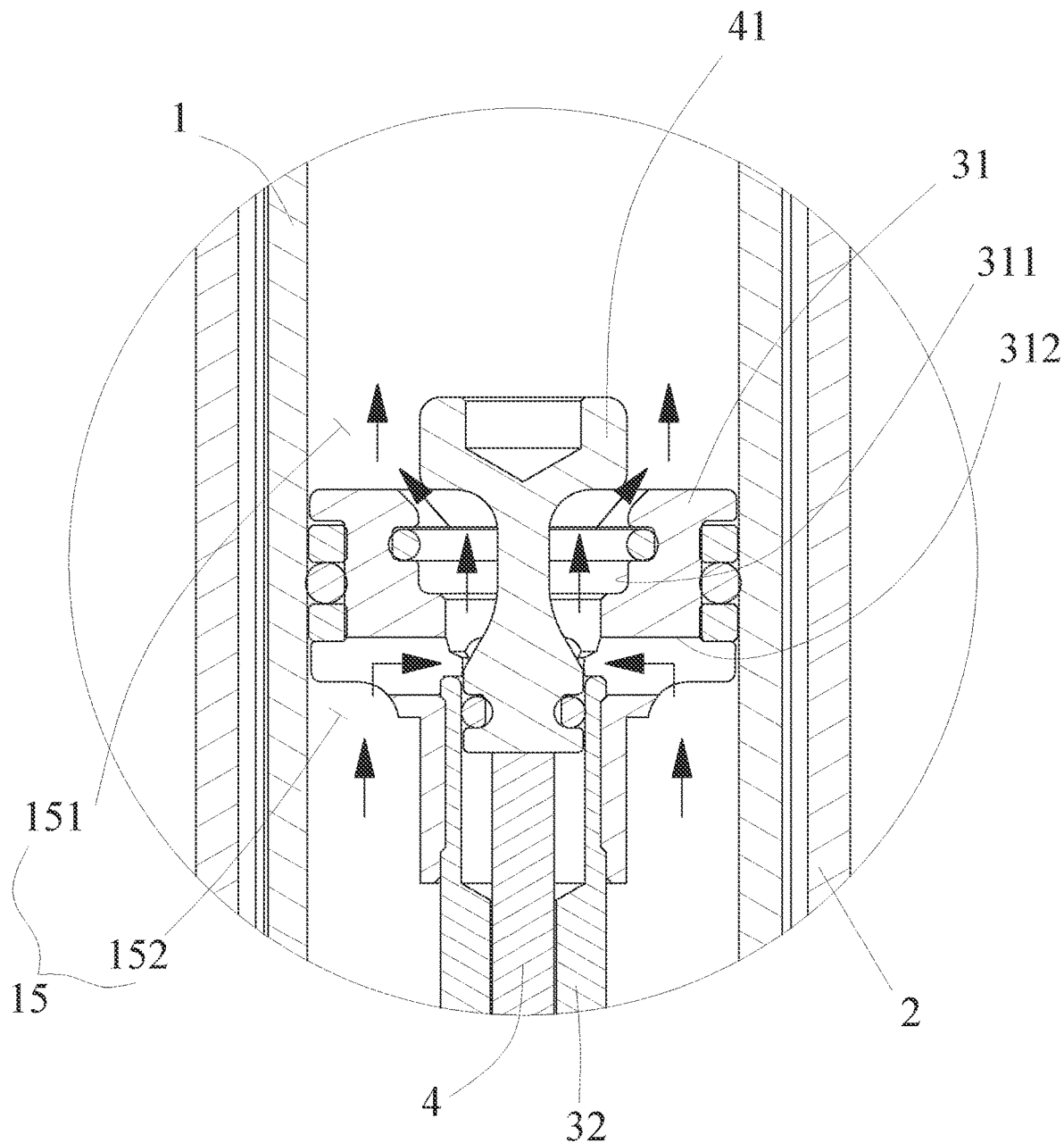
FIG. 6 is a partial enlarged sectional view showing flowing of hydraulic oil in a hydraulic inner tube moved upward of an embodiment according to the present invention.
Figure 7:
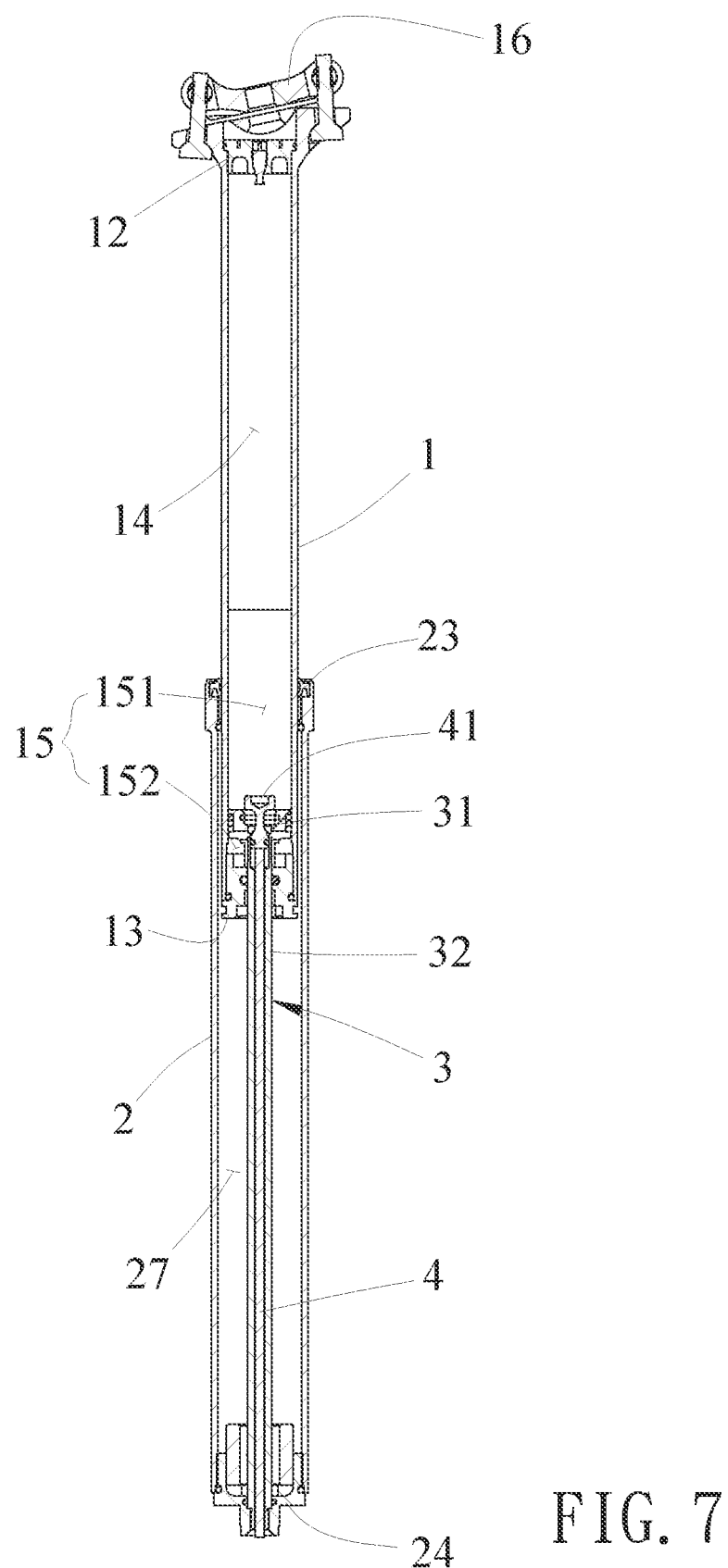
FIG. 7 is a sectional view showing a hydraulic inner tube moved upward to a positioned state of an embodiment according to the present invention.

Refer to FIG. 5, when the user intends to lift the saddle, a valve-open signal sent from the control member of the bicycle grip drives the valve block 41 of the valve stem 4 to be released from the valve hole 311 of the piston 31 and high pressure gas in the second gas chamber 27 of the outer tube 2 formed by compression is also released to push the hydraulic inner tube 1 moving upward. Also refer to FIG. 6, at the same time the hydraulic oil in the second oil chamber 152 of the hydraulic inner tube 1 is squeezed by the rising hydraulic inner tube 1 to pass through the diversion holes 312 around the piston 31 and the valve hole 311 of the piston 31, and then flow back to the first oil chamber 151. Now air in the first gas chamber 14 of the hydraulic inner tube 1 is compressed by the hydraulic oil flowing back to the first oil chamber 151. In order to release the pressure caused by the compression, the air in the first gas chamber 14 further pushes the hydraulic inner tube 1 to move upward. Thereby quick adjustment of the saddle is achieved. Once the saddle is lifted to the height required, as shown in FIG. 7, a valve-close signal sent from the control member of the bicycle grip drives the valve stem 4 to return to the original position and close the valve hole 311 of the piston 31 for fixing the saddle at the height required.

When the hydraulic inner tube 1 is driven to move upward for lifting the saddle, the pressure of high-pressure gas in the second gas chamber 27 between the hydraulic inner tube 1 and the outer tube 2 not only improves speed and fluency of the hydraulic inner tube 1, but also optimizes concentricity and side force resistance of the hydraulic inner tube 1 and the outer tube 2. Abnormal sound produced by bubbles during movement of the hydraulic inner tube 1 is also reduced by the high-pressure gas in the second gas chamber 27. Moreover, the at least one first seal member 22 is fitted in the outer tube hole 21 at the first end of the outer tube 2 and in close contact with the wall surface of the outer tube hole 21 of the outer tube 2 and the outer wall of the hydraulic inner tube 1 while the at least one second seal member 25 is mounted to the outer wall of the second outer-tube plug 24 of the outer tube 2 and in close contact with the wall surface of the outer tube hole 21 of the outer tube 2. The at least one third seal member 26 is mounted to the wall surface of the second through hole 241 of the second outer-tube plug 24 and in close contact with an outer wall of the piston rod 32. The arrangement of the first seal member 22, the second seal member 25, and the third seal member 26 protects the outer tube 2 from pollutants outside such as moisture, sand, dust, salt, etc. which cause oxidation, fouling, interference, abrasion inside the outer tube 2 for improving durability and the service life of the present device.

Figure 8:
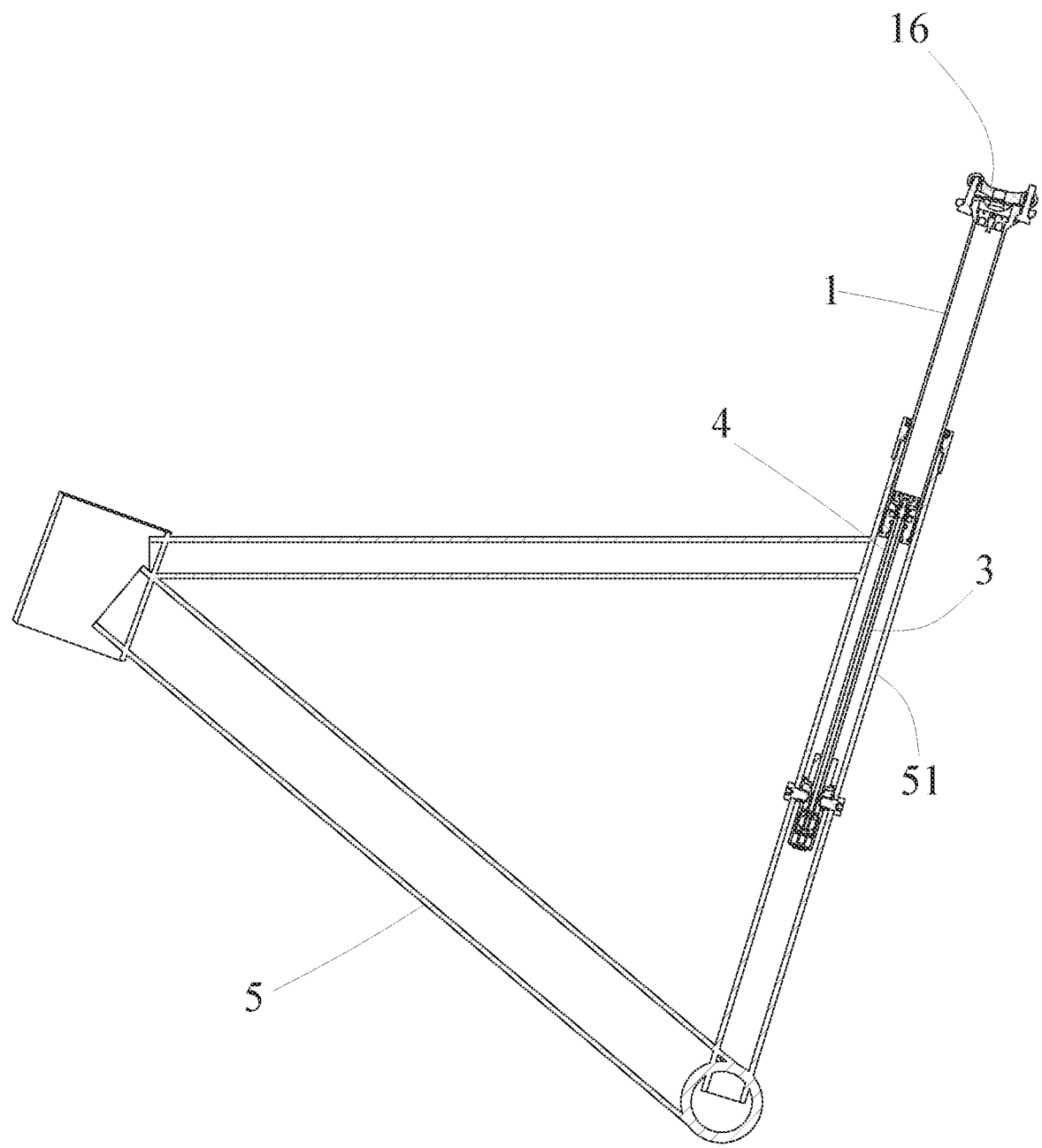
FIG. 8 is a sectional view of another embodiment according to the present invention.

Refer to FIG. 8, another embodiment is disclosed. In this embodiment, a seat tube 51 of a frame 5 of a bicycle can be used as the outer tube 2 and the purposes of increasing speed and fluency of the hydraulic inner tube 1 moved upward are also achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A dropper seatpost with double gas chambers comprising:
   a hydraulic inner tube which is provided with a first and a second end opposite to each other and is composed of:
      an inner tube hole which is formed in a length direction thereof, penetrating the first end and the second end of the hydraulic inner tube, and filled with hydraulic oil and gas therein,
      a first inner-tube plug mounted in the inner tube hole at the first end,
      a second inner-tube plug arranged in the inner tube hole at the second end and provided with a through hole at a center of the second inner-tube plug,
      a first gas chamber formed between a surface of the hydraulic oil and the first inner-tube plug, and
      an oil storage space formed between the surface of the hydraulic oil and the second inner-tube plug;
   an outer tube which is having a first and a second end opposite to each other and is provided with an outer tube hole formed in a length direction thereof, penetrating the first end and the second end, and filled with gas;
      a first outer-tube plug mounted in the outer tube hole at the first end and provided with a first through hole at a center of the first outer-tube plug;
      a second outer-tube plug arranged in the outer tube hole at the second end and provided with a second through hole at a center of the second outer-tube plug; and
      a second gas chamber formed between the hydraulic inner tube and the outer tube;
      the second end of the hydraulic inner tube is inserted into the first through hole of the first outer-tube plug so that the second end of the hydraulic inner tube is mounted in the outer tube hole;
   a piston set including
      a piston having a first end and a second end opposite to each other and located in the inner tube hole of the hydraulic inner tube for separating the oil storage space of the hydraulic inner tube into a first oil chamber located between the surface of the hydraulic oil and the first end of the piston and a second oil chamber located between the second end of the piston and the second inner-tube plug; the piston is provided with a valve hole disposed on a center of the piston and penetrating the first end and the second end of the piston, and a plurality of diversion holes arranged around the piston and communicating with the valve hole; and
      a piston rod having a first end and a second end opposite to each other and being inserted and mounted in the through hole of the second inner-tube plug of the hydraulic inner tube so that the first end of the piston rod is located in the inner tube hole of the hydraulic inner tube while the second end of the piston rod is located in the outer tube hole of the outer tube; the piston rod is provided with a penetrating hole formed therein lengthwise and penetrating the first end and the second end thereof while the first end of the piston rod is mounted in the valve hole at the second end of the piston and the second end of the piston rod is connected to the second through hole of the second outer-tube plug; and
   a valve stem which is inserted and mounted in the penetrating hole of the piston rod and provided with a first end and a second end opposite to each other and a valve block which is disposed on the first end of the valve stem and abutting against the valve hole at the first end of the piston correspondingly; the second end of the valve stem is inserted through the second through hole of the second outer-tube plug and exposed outside.

2. The dropper seatpost with double gas chambers as claimed in claim 1, wherein at least one first seal member is fitted in the outer tube hole at the first end of the outer tube and in close contact with a wall surface of the outer tube hole and an outer wall of the hydraulic inner tube; at least one second seal member is mounted to an outer wall of the second outer-tube plug at the second end of the outer tube and in close contact with the wall surface of the outer tube hole; at least one third seal member is mounted to a wall surface of the second through hole of the second outer-tube plug and in close contact with an outer wall of the piston rod.

3. The dropper seatpost with double gas chambers as claimed in claim 1, wherein a saddle assembly member is arranged at the first end of the hydraulic inner tube.

4. The dropper seatpost with double gas chambers as claimed in claim 1, wherein the outer tube is a seat tube of a frame of a bicycle.

* * * * *